(12) United States Patent
Kinoshita

(10) Patent No.: US 12,014,636 B2
(45) Date of Patent: Jun. 18, 2024

(54) DELIVERY APPROVAL APPARATUS AND DELIVERY APPROVAL METHOD

(71) Applicant: Honda Motor Co., Ltd., Tokyo (JP)

(72) Inventor: Shuhei Kinoshita, Tokyo (JP)

(73) Assignee: Honda Motor Co., Ltd., Tokyo (JP)

(*) Notice: Subject to any disclaimer, the term of this patent is extended or adjusted under 35 U.S.C. 154(b) by 193 days.

(21) Appl. No.: 17/696,829

(22) Filed: Mar. 16, 2022

(65) Prior Publication Data
US 2022/0301437 A1  Sep. 22, 2022

(30) Foreign Application Priority Data
Mar. 18, 2021 (JP) ................... 2021-045068

(51) Int. Cl.
*G08G 1/00* (2006.01)
*G06Q 10/20* (2023.01)
*G06Q 50/40* (2024.01)

(52) U.S. Cl.
CPC ............. *G08G 1/205* (2013.01); *G06Q 10/20* (2013.01); *G06Q 50/40* (2024.01)

(58) Field of Classification Search
CPC ......... G08G 1/205; G06Q 10/02; G06Q 10/20
See application file for complete search history.

(56) References Cited

U.S. PATENT DOCUMENTS

| 10,802,486 B1 * | 10/2020 | Paul ................. G07C 5/006 |
| 2019/0189011 A1 | 6/2019 | Yanagida et al. |

FOREIGN PATENT DOCUMENTS

| JP | 2003060825 A | 2/2003 |
| JP | 2019109632 A | 7/2019 |
| JP | 2020080108 A | 5/2020 |
| JP | 2020160736 A | 10/2020 |

OTHER PUBLICATIONS

Japanese office action; Application 2021045068; dated Jan. 31, 2023.

* cited by examiner

*Primary Examiner* — Daniell L Negron
(74) *Attorney, Agent, or Firm* — Duft & Bornsen, PC (57) ABSTRACT

A delivery approval apparatus includes a microprocessor and a memory. The microprocessor is configured to perform: acquiring a position information of a user who has requested the predetermined service; acquiring a position information of the vehicle parked at a delivery place; receiving an agreement signal agreeing on a service result of the predetermined service and transmitted from a user terminal used by the user; and when the agreement signal is received, detecting a relative position of the user with respect to the vehicle, based on the position information of the user and a most previous position information of the vehicle, and when the user is located within a predetermined range from the vehicle, determining that the vehicle is delivered to the user to approve a completion of the predetermined service.

15 Claims, 7 Drawing Sheets

DELIVERY APPROVAL APPARATUS AND DELIVERY APPROVAL METHOD

CROSS-REFERENCE TO RELATED APPLICATION

This application is based upon and claims the benefit of priority from Japanese Patent Application No. 2021-045068 filed on Mar. 18, 2021, the content of which are incorporated herein by reference.

BACKGROUND OF THE INVENTION

Field of the Invention

This invention relates to a map generation apparatus configured to generate a map used for acquiring a position of a vehicle.

Description of the Related Art

There is conventionally a known apparatus that, upon reception of an image of a vehicle to be repaired that has been captured by a mobile telephone equipped with a camera, causes a predetermined service shop to create a repair estimate, and transmits the repair estimate that has been created to a user (for example, see JP2003-60825 A (JP 2003-60825 A)).

However, as in the apparatus described in JP 2003-60825 A, the repair estimate for the vehicle is obtainable without meeting a repair agent. However, when the vehicle that has been repaired is delivered, the user who has confirmed the vehicle needs to agree. Hence, it is difficult to approve the delivery of the vehicle without attendance of the repair agent.

SUMMARY OF THE INVENTION

An aspect of the present invention is a delivery approval apparatus approving a service completion in association with a vehicle for which a predetermined service is provided. The delivery approval apparatus includes a microprocessor and a memory connected to the microprocessor. The microprocessor is configured to perform: acquiring a position information of a user who has requested the predetermined service; acquiring a position information of the vehicle parked at a delivery place; receiving an agreement signal agreeing on a service result of the predetermined service, the agreement signal transmitted from a user terminal used by the user; and when the agreement signal is received, detecting a relative position of the user with respect to the vehicle, based on the position information of the user acquired in the acquiring the position information of the user and a most previous position information of the vehicle acquired in the acquiring the position information of the vehicle, and when the user is located within a predetermined range from the vehicle, determining that the vehicle is delivered to the user to approve a completion of the predetermined service.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, an embodiment of the present invention will be described with reference to FIGS. 1 to 6B. A delivery approval apparatus according to an embodiment of the present invention is an apparatus for approving service completion in association with a delivery of the vehicle, for which a predetermined service has been provided, to a user without the attendance of a business agent who provides the predetermined service. In the following, a description will be given with regard to an example of approving repair completion in association with the delivery of the vehicle that has been repaired to a user without the attendance of a repair agent who has repaired the vehicle.

Figure 1:
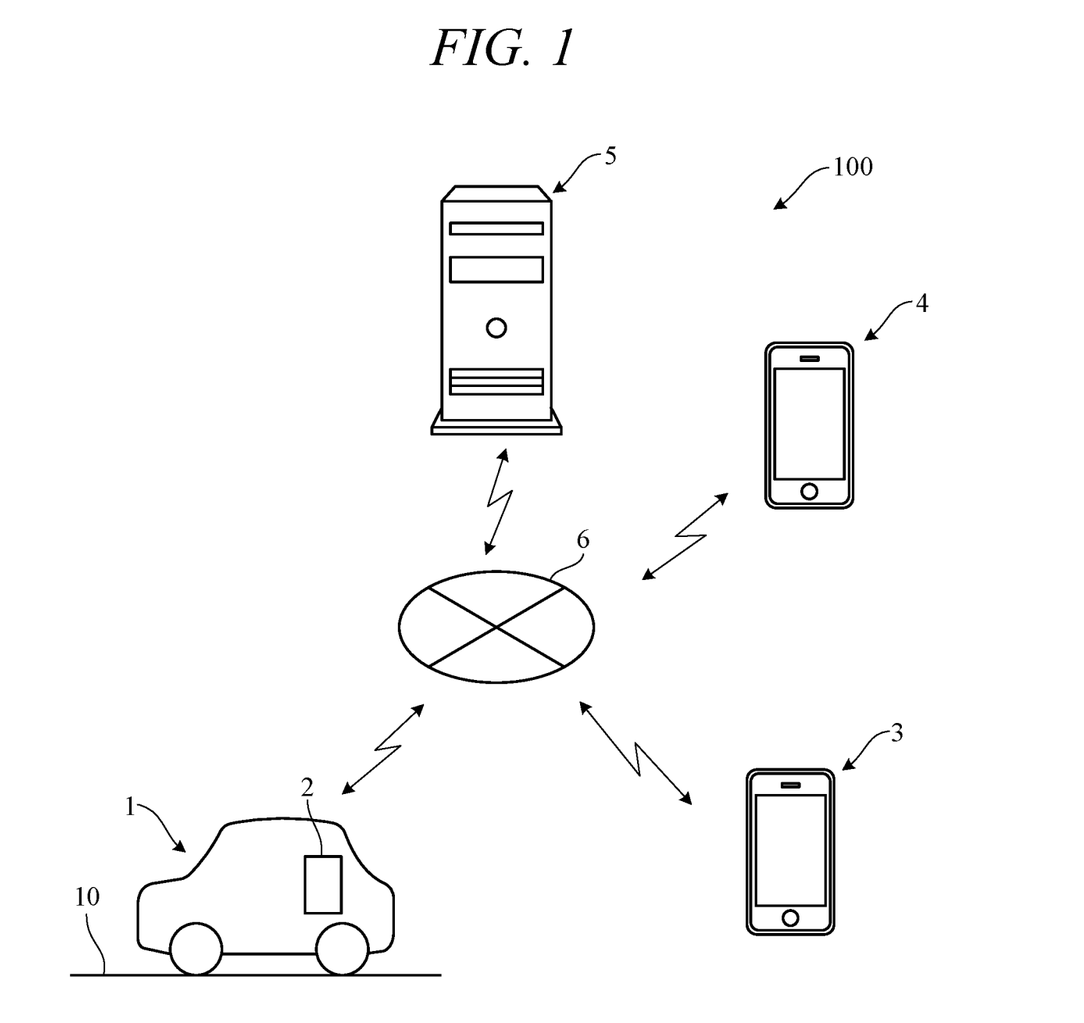
FIG. 1 is a diagram illustrating an example of a configuration of a system including a delivery approval apparatus according to an embodiment of the present invention.

FIG. 1 is a diagram illustrating an example of a configuration of a system (hereinafter, referred to as a delivery approval system) including a delivery approval apparatus according to an embodiment of the present invention. As illustrated in FIG. 1, a delivery approval system 100 includes an in-vehicle apparatus 2 mounted in a vehicle 1, a user terminal 3 used (carried) by a user who has requested a repair (predetermined service) of the vehicle 1, a business agent terminal 4 used (managed) by a repair agent (service business agent) that repairs the vehicle 1, and a delivery approval apparatus 5 used (managed) by a business entity that has sold the vehicle 1.

The in-vehicle apparatus 2, the user terminal 3, the business agent terminal 4, and the delivery approval apparatus 5 are configured to be communicable with each other via a communication network 6. The communication network 6 includes not only a public wireless communication network represented by the Internet networking, a mobile telephone network, or the like, but also a closed communication network provided for every predetermined management region, for example, a wireless LAN, Wi-Fi (registered trademark), or the like.

Figure 2:
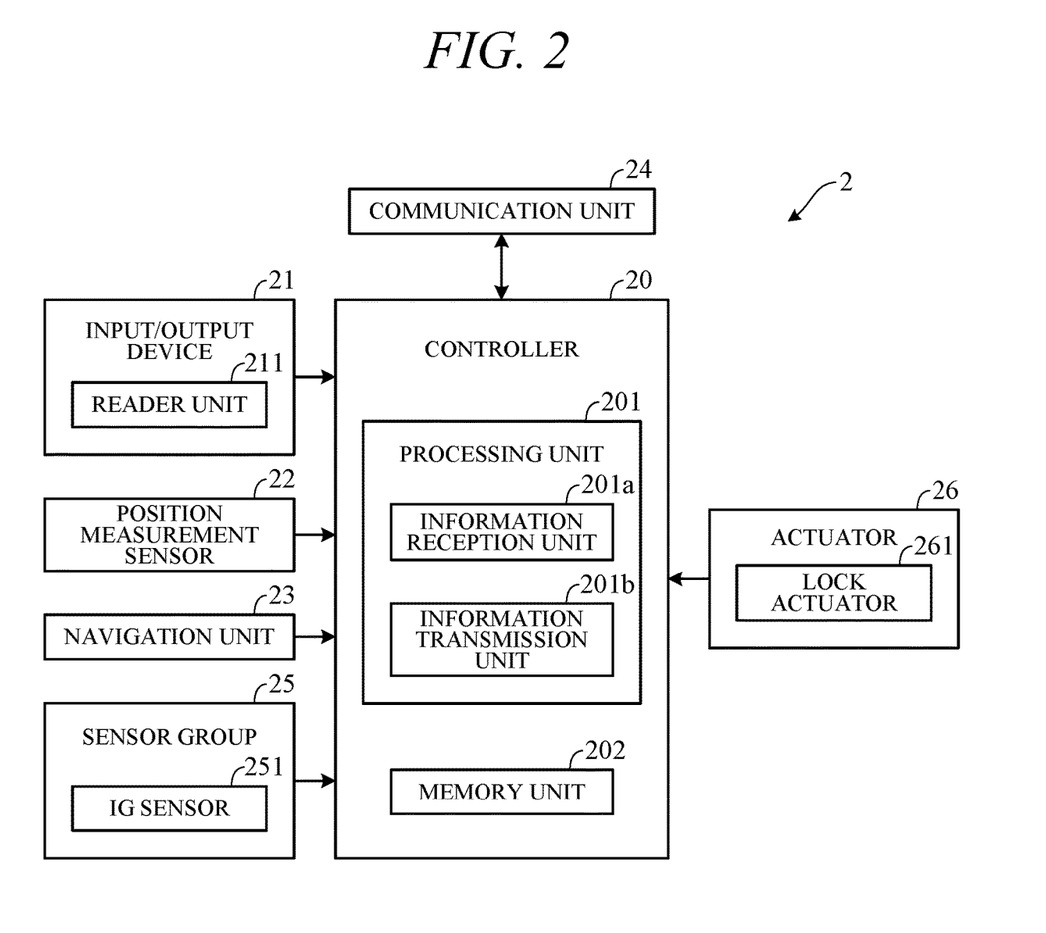
FIG. 2 is a block diagram illustrating a configuration of main parts of the in-vehicle apparatus in FIG. 1.

FIG. 2 is a block diagram illustrating a configuration of main parts of the in-vehicle apparatus 2 in FIG. 1. As illustrated in FIG. 2, the in-vehicle apparatus 2 mainly includes a controller 20, an input/output device 21, a position measurement sensor 22, a navigation unit 23, a communication unit 24, a sensor group 25, and an actuator 26, which are electrically connected with the controller 20.

The input/output device 21 is a general term for devices into which a command from a user present in the vehicle 1 is input or from which information is output to the user. For example, the input/output device 21 includes various switches for the user to input various commands by an operation of an operation member, a microphone for the user to input a command by voices, a monitor that provides the user with information via a display image, a speaker that provides the user with information by sounds, and the like.

In addition, the input/output device 21 includes a reader unit 211 that reads activation permission information of the vehicle 1 from the user terminal 3 or the business agent terminal 4. The activation permission information is a so-called virtual key (electronic key), and enables a function similar to that of a smart key of the vehicle 1. For example, by possessing a mobile wireless terminal (for example, a smartphone) in which the virtual key is stored, it becomes possible to unlock or lock the door of the vehicle 1 and to start or stop the engine of the vehicle 1.

The position measurement sensor 22 is, for example, a global positioning system (GPS) sensor, receives a positioning signal that has been transmitted from a GPS satellite, and measures the position of the vehicle 1, based on the signal that has been received. The navigation unit 23 is a device that searches for a target route on roads to a destination that has been input by the user and that also gives guidance along the target route. An input of the destination and the guidance along the target route are made via the input/output device 21. The communication unit 24 is configured to be wirelessly communicable with external apparatuses such as the user terminal 3, the business agent terminal 4, and the delivery approval apparatus 5 through the communication network 6.

The sensor group 25 is a general term for a plurality of sensors that detect the state and the like of the vehicle 1. As an example, the sensor group 25 includes an ignition sensor (hereinafter, referred to as an IG sensor) 251 that detects an ignition-on signal (hereinafter, referred to as an IG-ON signal) and an ignition-off signal (hereinafter, referred to as an IG-OFF signal). Although not illustrated, the sensor group 25 includes a vehicle speed sensor that detects the vehicle speed of the vehicle 1, an acceleration sensor that detects the acceleration in a front-and-rear direction and the acceleration in a left-and-right direction (lateral acceleration) of the vehicle 1, a rotation speed sensor that detects the rotation speed or the like of the drive source, a sensor that detects the operation or the like of the accelerator pedal or the steering wheel.

The actuator 26 actuates various apparatuses mounted in the vehicle 1 in accordance with a command from the controller 20. The actuator 26 includes, for example, a lock actuator 261 that unlocks or locks the door. Although not illustrated, the actuator 26 includes a start actuator that starts a drive source of the vehicle 1, a driving actuator that drives the vehicle 1, a stop actuator that stops the drive source of the vehicle 1, and the like.

The controller 20 includes a computer including a processing unit 201 such as a CPU (microprocessor), a memory unit 202 such as a ROM, a RAM, and a hard disk, and other peripheral circuits, not illustrated. The processing unit 201 functions as an information reception unit 201a and an information transmission unit 201b by executing a program stored beforehand in the memory unit 202.

The information reception unit 201a receives various types of information and various signals detected by each unit of the in-vehicle apparatus 2. For example, the information reception unit 201a receives position information of the vehicle 1 that has been measured by the position measurement sensor 22, the IG-OFF signal that has been detected by the IG sensor 251, and the like.

The information transmission unit 201b transmits various types of information and various signals that have been received by the information reception unit 201a to an external apparatus such as the delivery approval apparatus 5 via the communication unit 24. For example, the information transmission unit 201b transmits the position information of the vehicle 1 and the IG-OFF signal that have been received by the information reception unit 201a to the delivery approval apparatus 5 via the communication unit 24.

Figure 3:
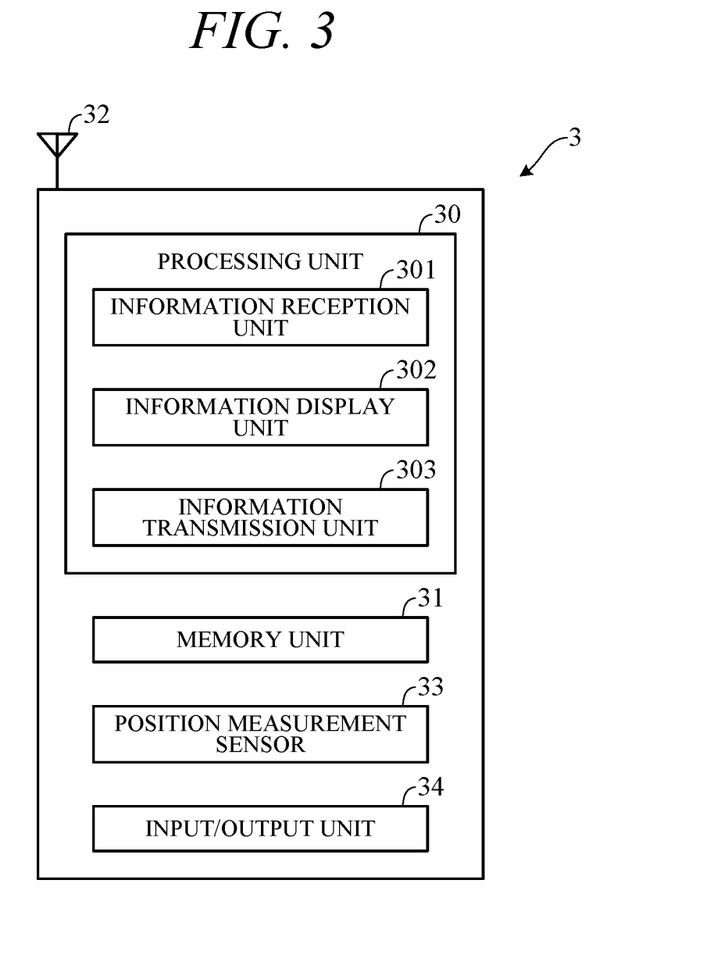
FIG. 3 is a block diagram illustrating a configuration of main parts of the user terminal in FIG. 1.

FIG. 3 is a block diagram illustrating a configuration of main parts of the user terminal 3 in FIG. 1. The user terminal 3 is a terminal operated by the user, and includes a mobile wireless terminal represented by a smartphone, or the like. As illustrated in FIG. 3, the user terminal 3 includes a computer including a processing unit 30 such as a CPU, a memory unit 31 such as a ROM and a RAM, a communication unit 32, a position measurement sensor 33, an input/output unit 34, and other peripheral circuits, not illustrated, such as an I/O interface.

The communication unit 32 is configured to be wirelessly communicable with external apparatuses such as the delivery approval apparatus 5 through the communication network 6. The position measurement sensor 33 is, for example, a GPS sensor, receives a positioning signal that has been transmitted from a GPS satellite, and measures the position of the user terminal 3, based on the signal that has been received. The input/output unit 34 is a general term for devices that input and output various commands and the like, and includes a monitor, a touch panel, and the like. The user inputs an estimate request command, a repair request command, a repair result agreement command, a re-repair request command, a payment agreement command, and the like via the input/output unit 34.

The processing unit 30 functions as an information reception unit 301, an information display unit 302, and an information transmission unit 303 by executing a program stored in the memory unit 31 beforehand. The information reception unit 301 receives various types of information transmitted from an external apparatus such as the delivery approval apparatus 5, various types of information and various signals transmitted from each unit, and the like. For example, the information reception unit 301 receives, via the communication unit 32, estimate information, repair completion information, repair cost information, validation information and invalidation information of the virtual key, and the like of the vehicle 1 that are transmitted from the delivery approval apparatus 5. In addition, the information reception unit 301 receives the estimate request command, the repair request command, the repair result agreement command, the re-repair request command, and the payment agreement command that have been input via the input/output unit 34, the position information that has been measured by the position measurement sensor 33, and the like.

The information display unit 302 displays various types of information that have been received by the information reception unit 301, on the input/output unit (monitor) 34. For example, the information display unit 302 displays the estimate information, the repair completion information, and the repair cost information of the vehicle 1 that have been received by the information reception unit 301, on the input/output unit (monitor) 34. The user inputs a repair request command, a repair result agreement command, a payment agreement command, and the like via the input/ output unit (touch panel) 34, based on these pieces of information that have been displayed on the input/output unit 34.

The information transmission unit 303 transmits various types of information and signals of various commands that have been received by the information reception unit 301 to the delivery approval apparatus 5 and each unit. For example, the information transmission unit 303 transmits, via the communication unit 32, the position information of the user terminal 3, a signal of the estimate request command (hereinafter, referred to as an estimate request signal), a signal of the repair request command (hereinafter, referred to as a repair request signal), a signal of the repair result agreement command (hereinafter, referred to as an agreement signal), a signal of the re-repair request command (hereinafter, referred to as a re-repair signal), a signal of the payment agreement command (hereinafter, referred to as a payment signal), and the like to the delivery approval apparatus 5. In addition, the information transmission unit 303 transmits the validation information and the invalidation information of the virtual key to the memory unit 31.

The memory unit 31 stores various programs, various data, and the like, to be executed by the processing unit 30. The memory unit 31 also stores the virtual key (electronic key) of the vehicle 1. The virtual key stored in the memory unit 31 is validated by the validation information transmitted by the information transmission unit 303 being stored, and is invalidated by the invalidation information being stored.

Figure 4:
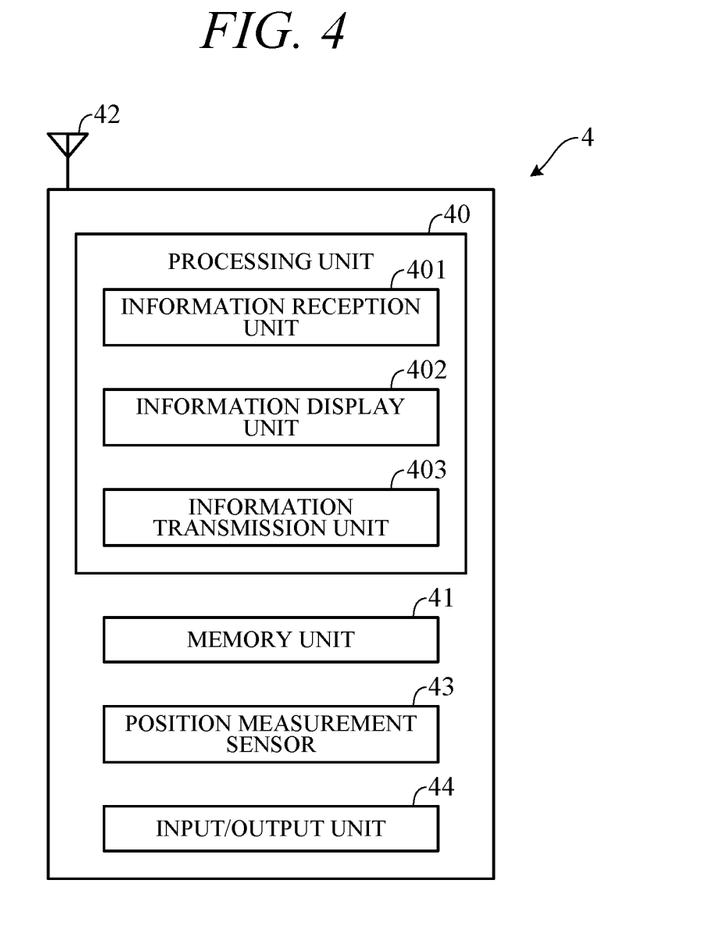
FIG. 4 is a block diagram illustrating a configuration of main parts of the business agent terminal in FIG. 1.

FIG. 4 is a block diagram illustrating a configuration of main parts of the business agent terminal 4 in FIG. 1. The business agent terminal 4 is a terminal operated by a repair agent, and includes a mobile wireless terminal represented by a smartphone, or the like. As illustrated in FIG. 4, the business agent terminal 4 includes a computer including a processing unit 40 such as a CPU, a memory unit 41 such as a ROM and a RAM, a communication unit 42, a position measurement sensor 43, an input/output unit 44, and other peripheral circuits (not illustrated) such as an I/O interface.

The communication unit 42 is configured to be wirelessly communicable with external apparatuses such as the delivery approval apparatus 5 through the communication network 6. The position measurement sensor 43 is, for example, a GPS sensor, receives a positioning signal that has been transmitted from a GPS satellite, and measures the position of the business agent terminal 4, based on the signal that has been received. The input/output unit 44 is a general term for devices that input and output various types of information and various commands, and includes a monitor, a touch panel, and the like. The repair agent inputs the estimate information, the repair completion information, the repair cost information, and the like of the vehicle 1 via the input/output unit 44.

The processing unit 40 functions as an information reception unit 401, an information display unit 402, and an information transmission unit 403 by executing a program stored beforehand in the memory unit 41. The information reception unit 401 receives various types of information transmitted from an external apparatus such as the delivery approval apparatus 5, various types of information and various signals transmitted from each unit, and the like. For example, the information reception unit 401 receives, via the communication unit 42, the position information of the vehicle 1, the information of the virtual key, the invalidation information of the virtual key, the estimate request signal, the repair request signal, the re-repair signal, and the like transmitted from the delivery approval apparatus 5. In addition, the information reception unit 401 receives the estimate information, the repair completion information, the repair cost information, and the like that have been input via the input/output unit 44. Furthermore, the information reception unit 401 receives the position information of the business agent terminal 4 that is a position measurement result of the position measurement sensor 43.

The information display unit 402 displays various types of information that have been received by the information reception unit 401, on the input/output unit (monitor) 44. For example, the information display unit 402 displays the position information of the vehicle 1 that has been received by the information reception unit 401, on the input/output unit 44. Further, when the information reception unit 401 receives the estimate request signal, the information display unit 402 displays character information or the like indicating that an estimate for the repair of the vehicle 1 has been requested. When the information reception unit 401 receives the repair request signal, the information display unit 402 displays character information or the like indicating that a repair of the vehicle 1 has been requested. When the information reception unit 401 receives the re-repair signal, the information display unit 402 displays character information or the like indicating that a re-repair of the vehicle 1 has been requested.

The information transmission unit 403 transmits various types of information that have been received by the information reception unit 401 to the delivery approval apparatus 5 and each unit. For example, the information transmission unit 403 transmits, via the communication unit 42, the estimate information, the repair completion information, the repair cost information, the position information of the business agent terminal 4, and the like to the delivery approval apparatus 5. In addition, the information transmission unit 403 transmits information of the virtual key and invalidation information of the virtual key to the memory unit 41.

The memory unit 41 stores various programs, various data, and the like, to be executed by the processing unit 40. In addition, the memory unit 41 stores a virtual key of the vehicle 1. The virtual key stored in the memory unit 41 is invalidated by the invalidation information transmitted by the information transmission unit 403 being stored.

Figure 5:
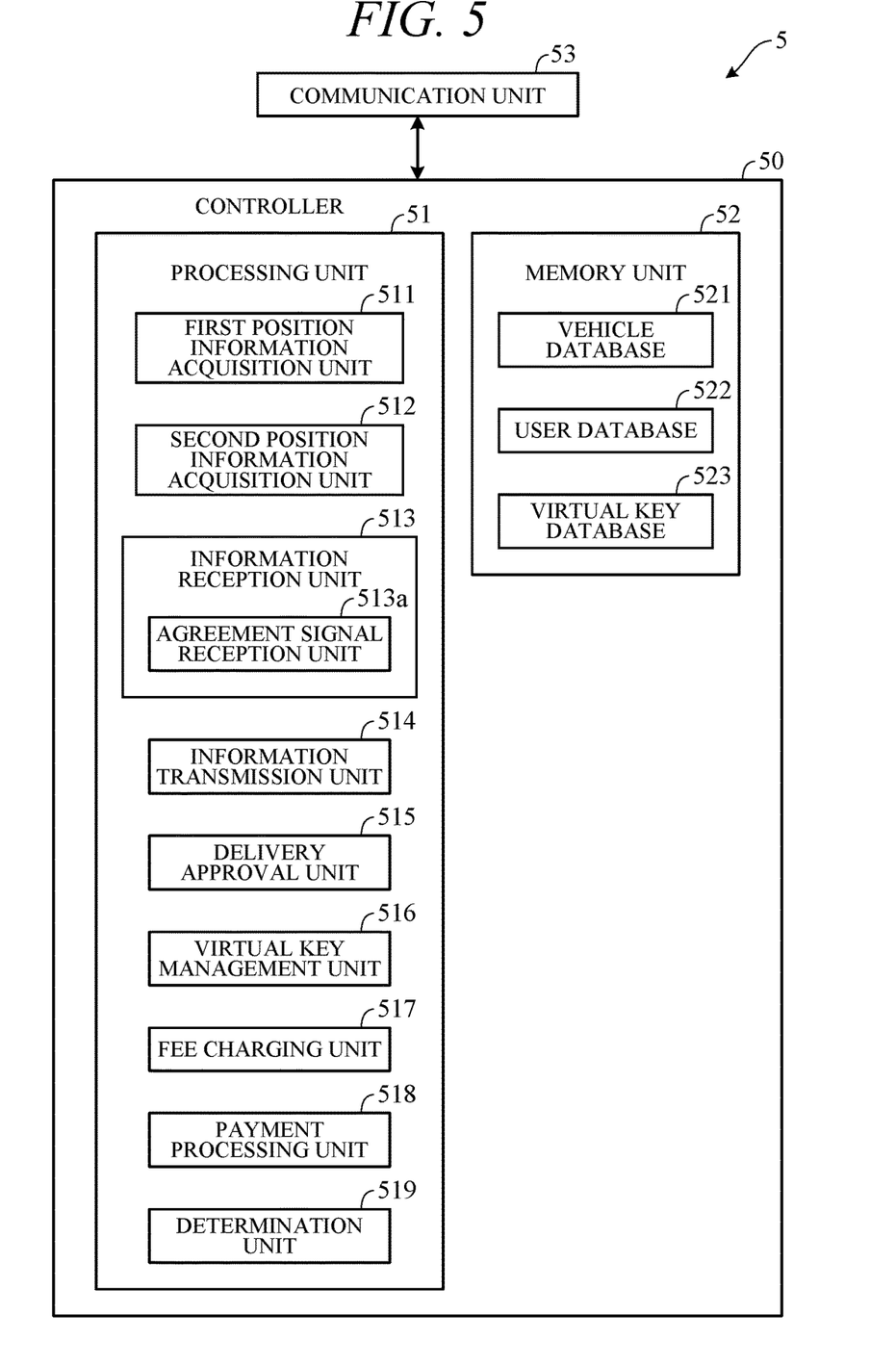
FIG. 5 is a block diagram illustrating a configuration of main parts of the delivery approval apparatus according to the embodiment of the present invention.

FIG. 5 is a block diagram illustrating a configuration of main parts of the delivery approval apparatus 5 according to the embodiment of the present invention. The delivery approval apparatus 5 is a terminal managed by an employee of a business entity (for example, an automobile sales dealer) that has sold the vehicle 1, and includes a server device. The delivery approval apparatus 5 can be configured with use of a virtual server function on a cloud, or may be configured to be distributed in a plurality of terminals.

As illustrated in FIG. 5, the delivery approval apparatus 5 includes a controller 50 and a communication unit 53 electrically connected with the controller 50. The communication unit 53 is configured to be wirelessly communicable with external apparatuses such as the in-vehicle apparatus 2, the user terminal 3, and the business agent terminal 4 through the communication network 6.

The controller 50 includes a computer including a processing unit 51 such as a CPU (microprocessor), a memory unit 52 such as a ROM, a RAM, and a hard disk, and other peripheral circuits, not illustrated. The processing unit 51 functions as a first position information acquisition unit 511, a second position information acquisition unit 512, an information reception unit 513, an information transmission unit 514, a delivery approval unit 515, a virtual key management unit (electronic key management unit) 516, a fee charging unit 517, a payment processing unit 518, and a determination unit 519. These units realize an approval process of approving repair completion of the vehicle 1 based on the position information of the vehicle 1 and the position information of the user that are present when the user agrees on the repair of the vehicle 1.

The first position information acquisition unit 511 acquires position information of the user who has requested the repair of the vehicle 1 via the communication unit 53. The first position information acquisition unit 511 regards the position information of the user terminal 3 as position information of the user, and acquires the position information of the user terminal 3 via the communication unit 53.

The second position information acquisition unit 512 acquires the position information of the vehicle 1 parked at a delivery place 10 via the communication unit 53. The second position information acquisition unit 512 regards the position information of the business agent terminal 4 as position information of the vehicle 1 parked at the delivery place 10, and acquires the position information of the business agent terminal 4 via the communication unit 53. For example, the second position information acquisition unit 512 acquires, as the position information of the vehicle 1, the position information of the business agent terminal 4 that is present when the ignition of the vehicle 1 is finally turned off by the virtual key stored in the business agent terminal 4, that is, when a most previous IG-OFF signal is transmitted from among the IG-OFF signals transmitted from the vehicle 1 after the start of the repair.

The information reception unit 513 receives, via the communication unit 53, various types of information and various signals transmitted from external apparatuses, such as the in-vehicle apparatus 2, the user terminal 3, and the business agent terminal 4. For example, the information reception unit 513 includes an agreement signal reception unit 513a. The agreement signal reception unit 513a receives an agreement signal transmitted from the user terminal 3 via the communication unit 53.

When the agreement signal is received by the agreement signal reception unit 513a, the delivery approval unit 515 detects a relative position of the user with respect to the vehicle 1, based on the position information of the user terminal 3 acquired by the first position information acquisition unit 511 and the position information of the business agent terminal 4 acquired by the second position information acquisition unit 512. In a case where the user is located within a predetermined range from the vehicle 1, the delivery approval unit 515 determines that the vehicle 1 has been delivered to the user, and approves the completion of the repair of the vehicle 1.

For example, when the agreement signal is received by the agreement signal reception unit 513a and it is detected that the user is located within a range of three meters from the center of the vehicle 1, the delivery approval unit 515 determines that the vehicle 1 has been delivered to the user, and outputs an approval signal indicating that the completion of the repair of the vehicle 1 has been approved. In other words, when the user transmits an agreement signal from the user terminal 3 to the delivery approval apparatus 5 while the user is located within the range of three meters from the center of the vehicle 1, the delivery approval unit 515 approves the completion of the repair of the vehicle 1. On the other hand, in a case where the user is not located within the range of three meters from the center of the vehicle 1 when the agreement signal is received by the agreement signal reception unit 513a, the delivery approval unit 515 outputs a disapproval signal.

In addition to the above information, the information reception unit 513 receives the IG-OFF signal transmitted from the in-vehicle apparatus 2, the estimate request signal, the repair request signal, the re-repair signal, and the payment signal transmitted from the user terminal 3, the estimate information, the repair completion information, the repair cost information, and the like transmitted from the business agent terminal 4. In addition, the information reception unit 513 receives an approval signal and a disapproval signal output from the delivery approval unit 515.

The information transmission unit 514 transmits various types of information and various signals received by the information reception unit 513 to the user terminal 3, the business agent terminal 4, and the like via the communication unit 53. For example, when the information reception unit 513 receives the estimate request signal, the information transmission unit 514 transmits the estimate request signal that has been received to the business agent terminal 4. In addition, when the information reception unit 513 receives the estimate information, the information transmission unit 514 transmits the estimate information that has been received to the user terminal 3. When the information reception unit 513 receives the repair request signal, the information transmission unit 514 transmits the repair request signal that has been received to the business agent terminal 4. Further, when the information reception unit 513 receives the repair signal, the information transmission unit 514 transmits the repair signal that has been received to the business agent terminal 4. Furthermore, when the information reception unit 513 receives the approval signal, the information transmission unit 514 transmits the approval signal to the fee charging unit 517. When the information reception unit 513 receives the disapproval signal, the information transmission unit 514 transmits the disapproval signal that has been received to the user terminal 3.

When the information reception unit 513 receives the repair request signal, the virtual key management unit 516 transmits the information of the virtual key stored in the memory unit 52 and the position information of the vehicle 1 to the business agent terminal 4, and also transmits the invalidation information of the virtual key to the user terminal 3. This enables the repair agent to move the vehicle 1, and also prohibits the user from moving the vehicle 1. In addition, when the delivery approval unit 515 approves the repair completion (outputs an approval signal), the virtual key management unit 516 transmits the invalidation information of the virtual key stored in the memory unit 52 to the business agent terminal 4, and also transmits the validation information of the virtual key to the user terminal 3. This enables the user to move the vehicle 1, and also prohibits the repair agent from moving the vehicle 1. Note that the virtual key management unit 516 may be configured to transmit the validation information of the virtual key to the user terminal 3, after a payment process is completed.

After the delivery approval unit 515 approves the repair completion, when the vehicle 1 is driven either for a predetermined period or for a predetermined distance, the fee charging unit 517 charges a fee for the repair of the vehicle 1. The fee charging unit 517 determines the price of the fee for the repair of the vehicle 1, based on the repair cost information that has been received by the information reception unit 513, and outputs charge information. When the charge information is output by the fee charging unit 517, the information reception unit 513 receives the charge information, and the information transmission unit 514 transmits the charge information to the user terminal 3.

In addition, the fee charging unit 517 has a function of setting either the predetermined period or the predetermined distance, based on a repair content of the vehicle 1. For example, in a case where the repair relates to an exterior appearance of the vehicle 1, it is possible to determine the necessity of the repair at a glance. Hence, the predetermined period or the predetermined distance is set to "0". On the other hand, in the determination of the necessity of the repair, in a case where it is necessary to drive the vehicle 1 to some extent for inspection, repair, replacement, or the like of an interior of the vehicle, either the predetermined period or the predetermined distance is set in accordance with the repair content. Before either the predetermined period elapses or the predetermined distance passes, when the information reception unit 513 receives the re-repair signal of the vehicle 1, the fee charging unit 517 suspends charging of the fee.

When the information reception unit 513 receives the payment signal, the payment processing unit 518 makes a payment, based on information necessary for the payment made by the user stored in the memory unit 52. The determination unit 519 determines whether the information reception unit 513 has received various types of information, various signals, and the like.

The memory unit 52 stores various programs, various data, and the like, to be executed by the processing unit 51. In addition, the memory unit 52 includes a vehicle database 521, a user database 522, and a virtual key database 523. The vehicle database 521 stores vehicle information of each of a plurality of vehicles registered beforehand. The vehicle information includes, for example, a vehicle ID, a driving distance, and a maintenance history of each vehicle. The user database 522 stores user information of each of a plurality of users registered beforehand. The user information includes, for example, a user ID, an address, a name, a contact address, a license number, information necessary for payment (for example, a credit card number), and the like of each user. The virtual key database 523 stores information of the virtual key corresponding to the vehicle ID and the user ID, the invalidation information and the validation information of the corresponding virtual key, and the like.

Figure 6A:
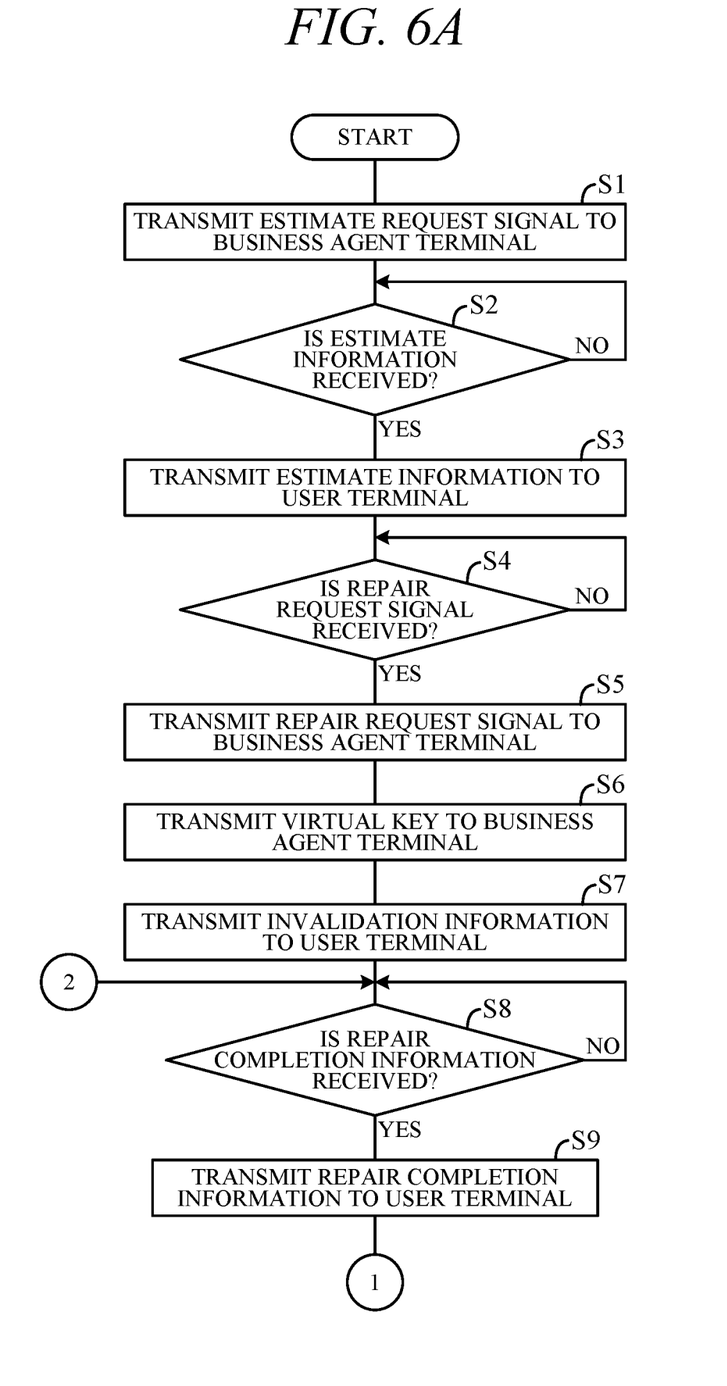
FIG. 6A is a flowchart illustrating an example of a delivery approval process performed by the processing unit of the delivery approval apparatus.
Figure 6B:
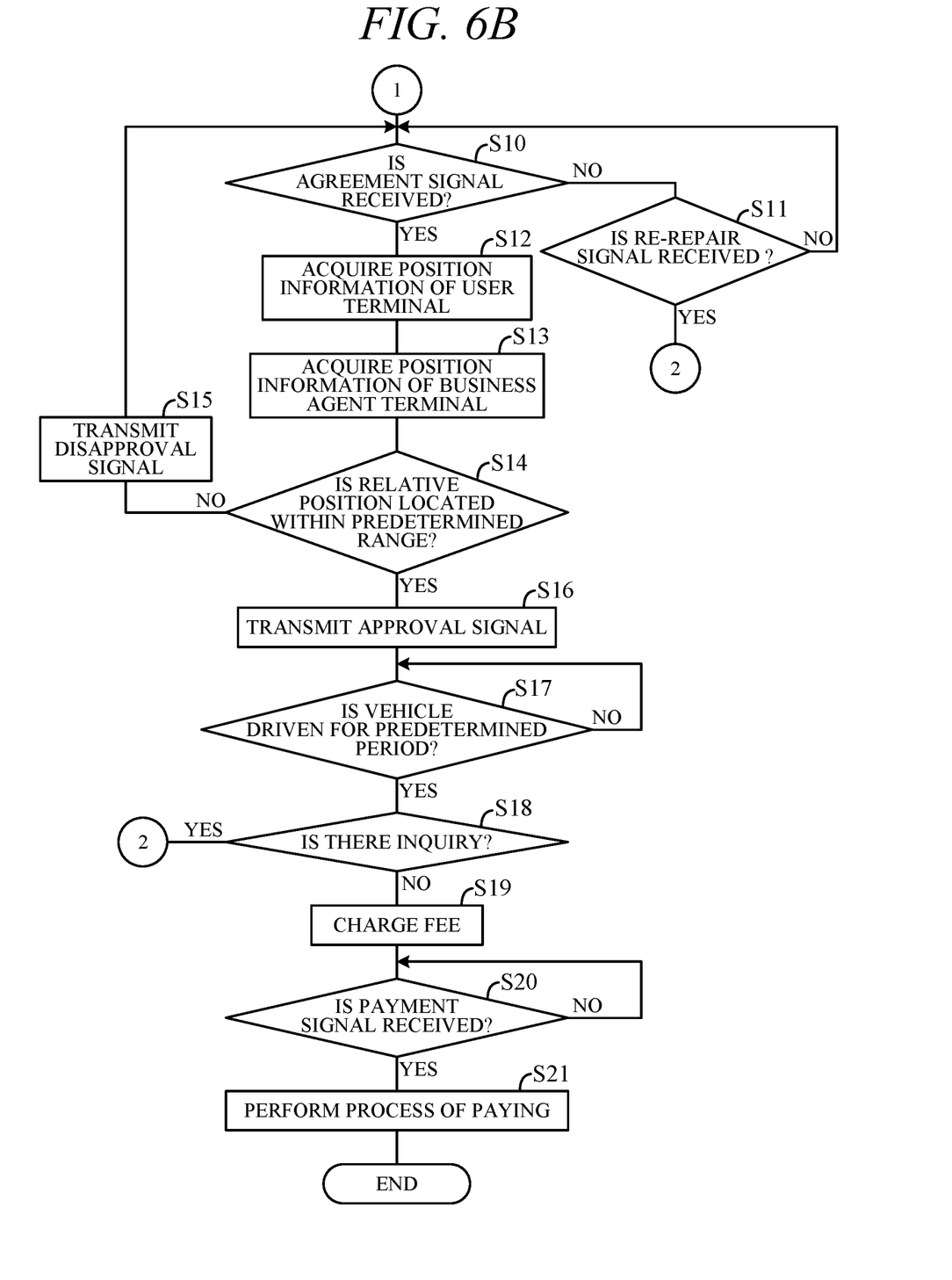
FIG. 6B is a flowchart illustrating an example of a delivery approval process performed by the processing unit of the delivery approval apparatus.

FIGS. 6A and 6B are flowcharts illustrating an example of a delivery approval process performed by the processing unit 51 of the delivery approval apparatus 5. The process illustrated in the flowcharts is started, for example, when the delivery approval apparatus 5 receives an estimate request signal from the user terminal 3.

First, in S1 (S denotes a process step), the information transmission unit 514 performs a process of transmitting the estimate request signal that has been received by the information reception unit 513 to the business agent terminal 4. Next, in S2, the determination unit 519 performs a process of determining whether the information reception unit 513 has received the estimate information transmitted from the business agent terminal 4. In a case where a negative determination is made in S2, the process is repeated until a positive determination is made. On the other hand, in a case where the positive determination is made in S2, the process proceeds to S3, and the information transmission unit 514 performs a process of transmitting the estimate information that has been received to the user terminal 3.

Next, in S4, the determination unit 519 performs a process of determining whether the information reception unit 513 has received the repair request signal transmitted from the user terminal 3. In a case where a negative determination is made in S4, the process is repeated until a positive determination is made. On the other hand, in the case where the positive determination is made in S4, the process proceeds to S5, and the information transmission unit 514 performs a process of transmitting the repair request signal that has been received to the business agent terminal 4.

Next, in S6, the virtual key management unit 516 performs a process of transmitting the virtual key information to the business agent terminal 4. Next, in S7, the virtual key management unit 516 performs a process of transmitting the invalidation information of the virtual key to the user terminal 3. Next, in S8, the determination unit 519 performs a process of determining whether the information reception unit 513 has received the repair completion information transmitted from the business agent terminal 4. When a negative determination is made in S8, the process is repeated until a positive determination is made. On the other hand, in a case where the positive determination is made in S8, the process proceeds to S9, and the information transmission unit 514 performs a process of transmitting the repair completion information to the user terminal 3.

Next, in step S10, the determination unit 519 performs a process of determining whether the agreement signal reception unit 513*a* has received the agreement signal transmitted from the user terminal 3. In a case where a negative determination is made in S10, the determination unit 519 performs a process, in S11, of determining whether the information reception unit 513 receives the re-repair signal transmitted from user terminal 3. In a case where a negative determination is made in S11, the process returns to S10. On the other hand, in a case where a positive determination is made, the process returns to S8, and waits until the repair completion information is received again.

On the other hand, in a case where a positive determination is made in S10, the process proceeds to S12, and the first position information acquisition unit 511 performs a process of acquiring the position information of the user terminal 3 (user). Next, in S13, the second position information acquisition unit 512 performs a process of acquiring the position information of the business agent terminal 4 (vehicle 1). Next, in S14, the delivery approval unit 515 performs a process of determining whether the relative position of the user with respect to the vehicle 1 is located within a predetermined range. In a case where a negative determination is made in S14, the information transmission unit 514 performs a process, in S15, of transmitting a disapproval signal to the user terminal 3, and the process returns to S10. On the other hand, in a case where a positive determination is made in S14, the delivery approval unit 515 performs a process, in S16, of approving the repair completion of the vehicle 1, and transmits the approval signal.

Next, in S17, after the delivery approval unit 515 approves the repair completion, the fee charging unit 517 performs a process of determining whether the vehicle 1 has been driven either for a predetermined period or for a predetermined distance. In a case where a negative determination is made in S17, the process is repeated until a positive determination is made. On the other hand, in a case where the positive determination is made in S17, the process proceeds to S18, and the determination unit performs a process of determining whether there has been an inquiry about the re-repair request from the user. In a case where a positive determination is made in S18, the process returns to S8, and waits until the repair completion information is received again.

On the other hand, in a case where a negative determination is made in S18, the information transmission unit 514 performs a process, in S19, of transmitting the charge information that has been set by the fee charging unit 517 to the user terminal 3. Next, in step S20, the determination unit 519 performs a process of determining whether the information reception unit 513 has received the payment signal transmitted from the user terminal 3. In a case where a negative determination is made in S20, the process is repeated until a positive determination is made. On the other hand, in a case where the positive determination is made in S20, the process proceeds to S21, and the payment processing unit 518 performs a process of paying the repair cost of the vehicle 1, and the process ends.

According to the present embodiment, advantageous effects can be achieved as follows.

(1) the delivery approval apparatus 5 according to the present embodiment is an apparatus that approves repair completion in association with a delivery of the vehicle 1. The delivery approval apparatus 5 includes a first position information acquisition unit 511 configured to acquire position information of a user who has requested a repair of the vehicle 1, the second position information acquisition unit 512 configured to acquire position information of the vehicle 1 parked at the delivery place 10, an agreement signal reception unit 513*a* configured to receive an agreement signal that agrees on a repair result (service result) of the vehicle 1 and that is transmitted from the user terminal 3, and the delivery approval unit 515 configured to detect a relative position of the user with respect to the vehicle 1, based on the position information of the user that has been acquired by the first position information acquisition unit 511 and most previous position information of the vehicle 1 that has been acquired most previously by the second position information acquisition unit 512, when the agreement signal reception unit 513*a* receives the agreement signal, and configured to approve completion of the repair of the vehicle 1 in association with a delivery of the vehicle 1 to the user, when the user is located within a predetermined range from the vehicle 1 (FIG. 5).

With this configuration, when the agreement signal from the user is received, the user is located within a predetermined range from the vehicle 1, and thus it can be considered that the user has confirmed the repaired state of the vehicle 1 and transmitted the agreement signal. This eliminates the need for the repair agent to attend at the time of delivery of the vehicle 1 that has been repaired.

(2) The second position information acquisition unit 512 acquires, as the position information of the vehicle 1, position information of the business agent terminal 4 that is present when an ignition of the vehicle 1 is turned off by a virtual key stored in the business agent terminal 4 used (owned) by a repair agent that repairs the vehicle 1 (FIG. 6B). With this configuration, the position information of the business agent terminal 4 can be regarded as the position information of the vehicle 1, and thus the position information of the vehicle 1 can be easily acquired. In addition, accurate position information can also be stored.

(3) The delivery approval apparatus 5 according to the present embodiment further includes the virtual key management unit 516 configured to transmit, to the user terminal 3, information for either validating or invalidating a virtual key stored in the user terminal 3 (FIG. 5). An information reception unit 513 further includes a request signal reception unit (not illustrated) configured to receive a request signal (repair request signal) that requests the repair of the vehicle 1 and that is transmitted from the user terminal 3. When the request signal reception unit receives the repair request signal, the virtual key management unit 516 transmits, to the user terminal 3, the information for invalidating the virtual key stored in the user terminal 3, and when the delivery approval unit 515 approves the completion of the repair of the vehicle 1, the virtual key management unit 516 transmits, to the user terminal 3, the information for validating the virtual key stored in the user terminal 3. With this configuration, for example, the virtual key stored in the user terminal 3 can be invalidated, when the repair is requested. After the repair completion is approved or the payment is completed, it is possible to validate the virtual key that has been stored in the user terminal 3 and that has been invalidated. Therefore, the use of the vehicle 1 is enabled with the repair result being agreed on. Thus, it is possible to avoid any trouble such as payment being forgotten, or any claim after the repair.

(4) The delivery approval apparatus 5 according to the present embodiment further includes the fee charging unit 517 configured to charge a fee for the repair of the vehicle 1, when the vehicle 1 is driven either for a predetermined period or for a predetermined distance after the delivery approval unit 515 approves the completion of the repair of the vehicle 1 (FIG. 5, FIG. 6B). With this configuration, even when the user notices a problem related to the repair after driving the vehicle 1, it is possible to flexibly handle the problem.

(5) The fee charging unit 517 has a function of setting either the predetermined period or the predetermined distance, based on a content of the repair of the vehicle 1 (FIG. 5). With this configuration, the period for making the payment can be changed depending on whether the repair is related to an exterior appearance of the vehicle 1 or the repair is related to an interior of the vehicle.

(6) The delivery approval method according to the present embodiment is a method for approving repair completion in association with a delivery of the vehicle 1 that has been repaired. The delivery approval method includes a process of acquiring position information of a user who has requested a repair of the vehicle 1, a process of acquiring position information of the vehicle 1 parked at a delivery place 10, a process of receiving an agreement signal that agrees on a repair result of the vehicle 1 and that is transmitted from the user terminal 3, and a process of detecting a relative position of the user with respect to the vehicle 1, based on the position information of the user and the position information of the vehicle 1, when the agreement signal is received, and approving service completion of the vehicle 1 in association with a delivery of the vehicle 1 to the user, when the user is located within a predetermined range from the vehicle 1 (FIGS. 5 to 6B).

With this configuration, when the agreement signal from the user is received, the user is located within a predetermined range from the vehicle 1, and thus it can be considered that the user has confirmed the repaired state of the vehicle 1 and transmitted the agreement signal. This eliminates the need for the repair agent to attend at the time of delivery of the vehicle 1 that has been repaired.

The above embodiment can be modified into various forms. For example, in the above embodiment, the position information of the business agent terminal 4 present when the most previous IG-OFF signal of the IG-OFF signals that have been input into the vehicle 1 by the virtual key stored in the business agent terminal 4 is input is set as the position information of the vehicle 1 parked at the delivery place 10, but the present invention is not limited to this. For example, the position information of the vehicle 1 measured by the position measurement sensor 22 mounted in the vehicle 1 present when the most previous IG-OFF signal of the IG-OFF signals that have been input to the vehicle 1 is input may be used as the position information of the vehicle 1 parked at the delivery place 10. By using the position information that has been measured by the position measurement sensor 22 mounted in the vehicle 1, it is possible to grasp the position of the vehicle 1 parked at the delivery place 10 more accurately.

In addition, in the above embodiment, the description has been given with regard to an example in which the service completion in association with the delivery of the repaired vehicle 1 to the user is approved without the attendance of a repair agent who has repaired the vehicle 1, but the present invention is not limited to this. For example, the present invention can be used for an approval for the delivery of the vehicle that has been sold to a user at a predetermined place without the attendance of a sales dealer who has sold the vehicle. In this manner, by using the present invention for sales service of vehicles, it becomes possible to suppress the delivery cost and the labor cost.

In the above embodiment, the description has been given with regard to an example in which the user is located within a range of three meters from the center of the vehicle 1, as the relative position of the user with respect to the vehicle 1, but the relative position of the user with respect to the vehicle is not limited to this, and can be optionally set. For example, it may be configured that the delivery approval unit approves, when the user is located within a range of two meters from an outer edge of the vehicle 1.

The above embodiment can be combined as desired with one or more of the above modifications. The modifications can also be combined with one another.

According to the present invention, the delivery of the vehicle to the user can be approved without the attendance of the repair agent.

Above, while the present invention has been described with reference to the preferred embodiments thereof, it will be understood, by those skilled in the art, that various changes and modifications may be made thereto without departing from the scope of the appended claims.

What is claimed is:

1. A delivery approval apparatus approving a service completion in association with a vehicle for which a predetermined service is provided, the delivery approval apparatus comprising:
    a microprocessor and a memory connected to the microprocessor, wherein
    the microprocessor is configured to perform:
    acquiring position information of a user who has requested the predetermined service;
    acquiring position information of the vehicle parked at a delivery place;
    receiving an agreement signal agreeing on a service result of the predetermined service, the agreement signal transmitted from a user terminal used by the user; and
    when the agreement signal is received, detecting a relative position of the user with respect to the vehicle, based on the position information of the user acquired in the acquiring the position information of the user and a most previous position information of the vehicle acquired in the acquiring the position information of the vehicle, and when the user is located within a predetermined range from the vehicle, determining that the vehicle is delivered to the user to approve a completion of the predetermined service.

2. The delivery approval apparatus according to claim 1, wherein
    the microprocessor is configured to perform
    the acquiring the position information of the vehicle including acquiring, as the position information of the vehicle, position information of a business agent terminal used by a business agent providing the predetermined service when an ignition of the vehicle is turned off by an electronic key stored in the business agent terminal.

3. The delivery approval apparatus according to claim 1, wherein
    the microprocessor is configured to perform
    the acquiring the position information of the vehicle including acquiring position information measured by a position measurement sensor mounted in the vehicle.

4. The delivery approval apparatus according to claim 1, wherein
    the microprocessor is configured to further perform
    transmitting, to the user terminal, information for either validating or invalidating a virtual key stored in the user terminal.

5. The delivery approval apparatus according to claim 4, wherein
    the microprocessor is configured to further perform
    receiving a request signal for requesting the predetermined service, the request signal being transmitted from the user terminal used by the user, and
    the microprocessor is configured to perform
    the transmitting including transmitting, when the request signal is received in the receiving, information for invalidating the virtual key stored in the user terminal to the user terminal, and transmits, when a completion of the predetermined service is approved in the detecting, information for validating the virtual key stored in the user terminal to the user terminal.

6. The delivery approval apparatus according to claim 1, wherein
    the microprocessor is configured to further perform
    charging a fee for the predetermined service, when the vehicle is driven either for a predetermined period or for a predetermined distance after approving the completion of the predetermined service in association with the delivery of the vehicle.

7. The delivery approval apparatus according to claim 6, wherein
    the charging including setting either the predetermined period or the predetermined distance, based on content of the predetermined service.

8. A delivery approval apparatus approving a service completion in association with a vehicle for which a predetermined service is provided, the delivery approval apparatus comprising:
    a microprocessor and a memory connected to the microprocessor, wherein
    the microprocessor is configured to function as:
    a first position information acquisition unit configured to acquire position information of a user who has requested the predetermined service;
    a second position information acquisition unit configured to acquire position information of the vehicle parked at a delivery place;
    an agreement signal reception unit configured to receive an agreement signal agreeing on a service result of the predetermined service, the agreement signal transmitted from a user terminal used by the user; and
    a delivery approval unit configured to when the agreement signal is received, detect a relative position of the user with respect to the vehicle, based on the position information of the user acquired by the first position information acquisition unit and a most previous position information of the vehicle acquired by the second position information acquisition unit, and configured to, when the user is located within a predetermined range from the vehicle, determine that the vehicle is delivered to the user to approve a completion of the predetermined service.

9. The delivery approval apparatus according to claim 8, wherein
the second position information acquisition unit acquires, as the position information of the vehicle, position information of a business agent terminal used by a business agent providing the predetermined service when an ignition of the vehicle is turned off by an electronic key stored in the business agent terminal.

10. The delivery approval apparatus according to claim 8, wherein
the second position information acquisition unit acquires position information measured by a position measurement sensor mounted in the vehicle.

11. The delivery approval apparatus according to claim 8, wherein
the microprocessor is configured to further function as
a virtual key management unit configured to transmit, to the user terminal, information for either validating or invalidating a virtual key stored in the user terminal.

12. The delivery approval apparatus according to claim 11, wherein
the microprocessor is configured to further function as
a request signal reception unit configured to receive a request signal for requesting the predetermined service, the request signal being transmitted from the user terminal used by the user, wherein
the virtual key management unit is configured to transmit, when the request signal reception unit receives the request signal, information for invalidating the virtual key stored in the user terminal to the user terminal, and transmits, when the delivery approval unit approves a completion of the predetermined service, information for validating the virtual key stored in the user terminal to the user terminal.

13. The delivery approval apparatus according to claim 8, wherein
the microprocessor is configured to further function as
a fee charging unit configured to charge a fee for the predetermined service, when the vehicle is driven either for a predetermined period or for a predetermined distance after the delivery approval unit approves the completion of the predetermined service in association with the delivery of the vehicle.

14. The delivery approval apparatus according to claim 13, wherein
the fee charging unit is configured to set either the predetermined period or the predetermined distance, based on content of the predetermined service.

15. A delivery approval method approving a service completion in association with a vehicle for which a predetermined service is provided, the method comprising:
acquiring position information of a user who has requested the predetermined service;
acquiring position information of the vehicle parked at a delivery place;
receiving an agreement signal agreeing on a service result of the predetermined service, the agreement signal transmitted from a user terminal used by the user; and
detecting a relative position of the user with respect to the vehicle, based on the position information of the user acquired in the acquiring the position information of the user and a most previous position information of the vehicle acquired in the acquiring the position information of the vehicle, when the agreement signal is received, and when the user is located within a predetermined range from the vehicle, determining that the vehicle is delivered to the user to approve a completion of the predetermined service.

\* \* \* \* \*